US005652402A

United States Patent [19]

Kondo et al.

[11] Patent Number: 5,652,402

[45] Date of Patent: Jul. 29, 1997

[54] ELECTRONIC MUSICAL INSTRUMENT CAPABLE OF SPLITTING ITS KEYBOARD CORRESPONDINGLY TO DIFFERENT TONE COLORS

[75] Inventors: Masao Kondo; Yasunao Abe; Hideaki Shimaya, all of Hamamatsu, Japan

[73] Assignee: Yamaha Corporation, Japan

[21] Appl. No.: 603,401

[22] Filed: Feb. 20, 1996

Related U.S. Application Data

[63] Continuation of Ser. No. 203,795, Mar. 1, 1994, abandoned.

[30] Foreign Application Priority Data

Mar. 2, 1993 [JP] Japan .................................... 5-041527

[51] Int. Cl.[6] .......................... G09B 15/04; G10H 1/053; G10H 1/06

[52] U.S. Cl. ................................ 84/653; 84/659; 84/664; 84/478; 84/DIG. 4

[58] Field of Search ...................... 84/615–620, 622–625, 84/653–661, 477 R, 478, 631, 664, 708, DIG. 4

[56] References Cited

U.S. PATENT DOCUMENTS 4,862,784 9/1989 Kimpara .
5,229,533 7/1993 Sakurai ................................ 84/622 X

*Primary Examiner*—Stanley J. Witkowski
*Attorney, Agent, or Firm*—Graham & James LLP

[57] ABSTRACT

In an electronic musical instrument, a complete range of a keyboard can be split into at least two registers, so that a different kind of tone color can be assigned to each of two registers. The electronic musical instrument provides at least four tone-color designating switches, one edit switch and two kinds of indicators. Each of the four tone-color designating switches is capable of independently designating a certain tone color. Herein, two tone-color designating switches are provided to designate two tone colors respectively for use in one register, while other two tone-color designating switches are provided to designate two tone colors respectively for use in another register. The edit switch designates each of parameters which are used to define a property of the tone color. The first indicator indicates the tone color currently designated, while the second indicator indicates the parameter currently edited. Thus, the production of the musical tones using at least one of the two tone colors can be designated with respect to each of the two registers.

6 Claims, 10 Drawing Sheets

ELECTRONIC MUSICAL INSTRUMENT CAPABLE OF SPLITTING ITS KEYBOARD CORRESPONDINGLY TO DIFFERENT TONE COLORS

This is a continuation of application Ser. No. 08/203,795, filed on Mar. 1, 1994, and now abandoned.

BACKGROUND OF THE INVENTION

1. Field of the Invention

The present invention relates to an electronic musical instrument by which a split performance can be played by accessing each of the key ranges (i.e., registers) of the keyboard.

2. Prior Art

One of the electronic musical instruments conventionally known is desired to employ a so-called split-sounding function using two registers of the keyboard, i.e., an upper register and a lower register, which are obtained by splitting the complete range of the keyboard. Herein, a different tone color can be assigned to each of the registers of the keyboard. Thus, when the performer depresses keys respectively belonging to the registers, it is possible to produce the sounds whose tone colors are different from each other.

Moreover, the electronic musical instrument recently developed is desired to employ a so-called dual-sounding function by which two tone colors can be assigned to one key so that when being depressed, one key contributes to a simultaneous production of two sounds each having a different tone color. By combining the aforementioned split-sounding function and dual-sounding function, one electronic musical instrument can simultaneously produce the maximum four kinds of tone colors.

In the above-mentioned electronic musical instruments, on/off states of the split-sounding function or those of the dual-sounding function are indicated by turning the LEDs (i.e., light-emitting diodes) on and off, for example.

However, the above-mentioned electronic musical instrument suffers from a problem that the setting state of the keyboard currently played is hardly recognized by intuition. For example, even if a split mode of the keyboard is designated, it is difficult to instantaneously judge, particularly during the musical performance, whether the designated split mode also corresponds the dual-sounding operation using the upper and lower registers or not.

Further, when correcting the parameter of the tone color to be assigned, the relationship between the tone colors respectively assigned to the registers should be complex because such relationship depends on the designation of the split mode of the keyboard as well as the designation of the dual-sounding operation. In short, there is a problem that the desired tone color cannot be selected speedily.

SUMMARY OF THE INVENTION

Accordingly, it is an object of the present invention to provide an electronic musical instrument in which it is possible to recognize the setting state of the keyboard by intuition even when the split mode of the keyboard and/or the dual-sounding operation is designated.

It is another object of the present invention to provide an electronic musical instrument in which the tone color to be edited or corrected can be speedily designated.

According to a fundamental configuration of the present invention, an electronic musical instrument provides a keyboard and an operation panel. On a panel face of the operation panel, there are at least provided four tone-color designating switches, one edit switch and two kinds of indicators.

When the split-sounding mode is designated, the complete range of the keyboard is split into two registers. Each of the four tone-color designating switches is capable of independently designating a certain tone color. Herein, two tone-color designating switches are provided to designate two tone colors respectively for use in one register, while other two tone-color designating switches are provided to designate two tone colors respectively for use in another register. The edit switch designates each of parameters which are used to define a property of the tone color. The first indicator indicates the tone color currently designated, while the second indicator indicates the parameter currently edited.

Thus, the production of the musical tones using at least one of the two tone colors can be designated (or activated) with respect to each of the two registers. When the dual-sounding mode is designated, each register contributes to the production of the musical tones using both of the two tone colors.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings.

DESCRIPTION OF THE PREFERRED EMBODIMENT

Figure 1:
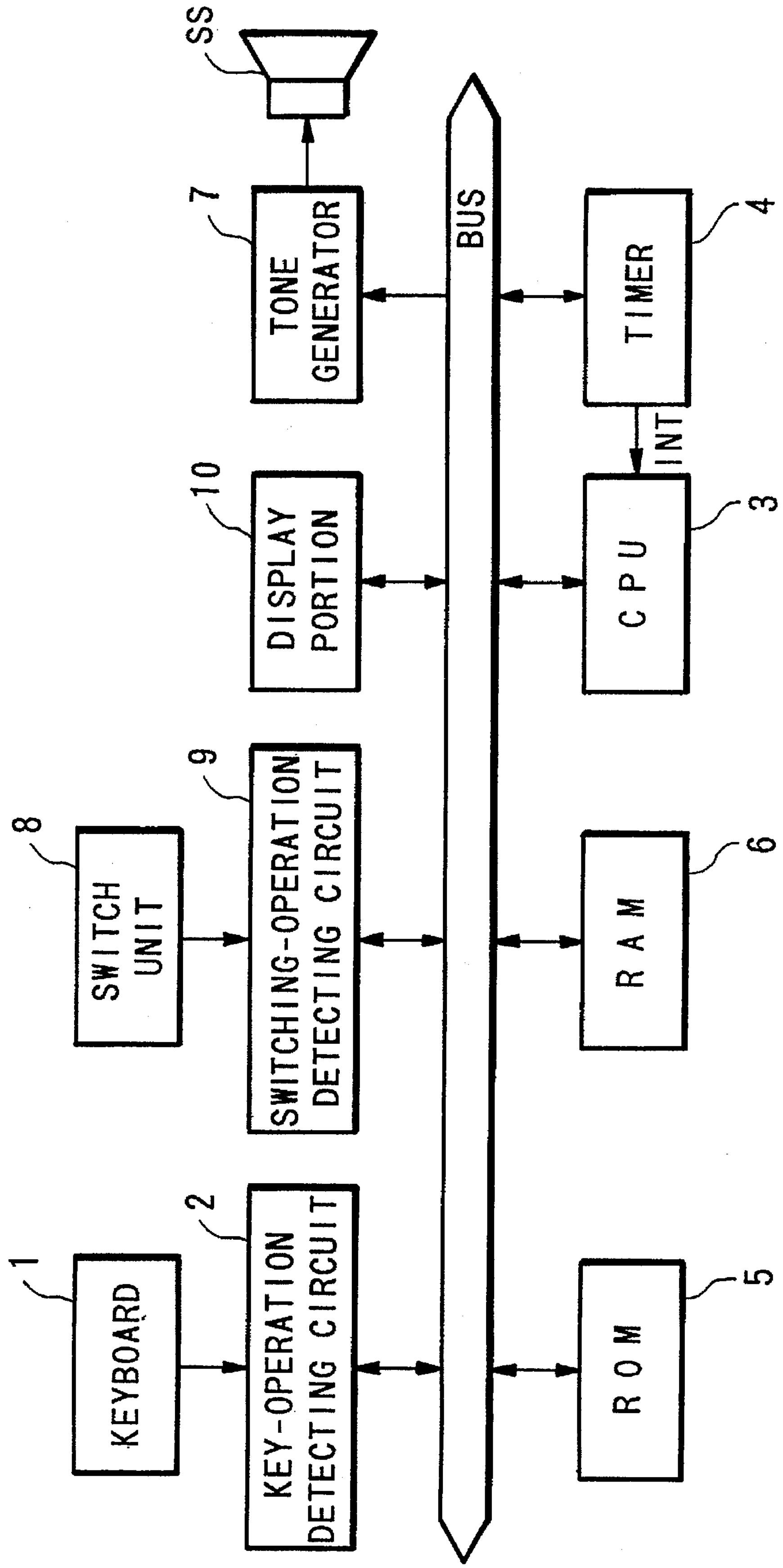
FIG. 1 Is a block diagram showing an electronic configuration of an electronic musical instrument according to an embodiment of the present invention.

Now, an electronic musical instrument according to an embodiment of the present invention will be described by referring to the drawings.

[A] Hardware Configuration

FIG. 1 is a block diagram showing an electronic configuration of the electronic musical instrument according to the embodiment of the present invention.

In FIG. 1, a keyboard 1 consists of a plurality of keys. When a split function is designated, the complete range of the keyboard 1 can be split into two registers, i.e., an upper register 1*a* and a lower register 1*b* as shown in FIG. 2.

Figure 2:
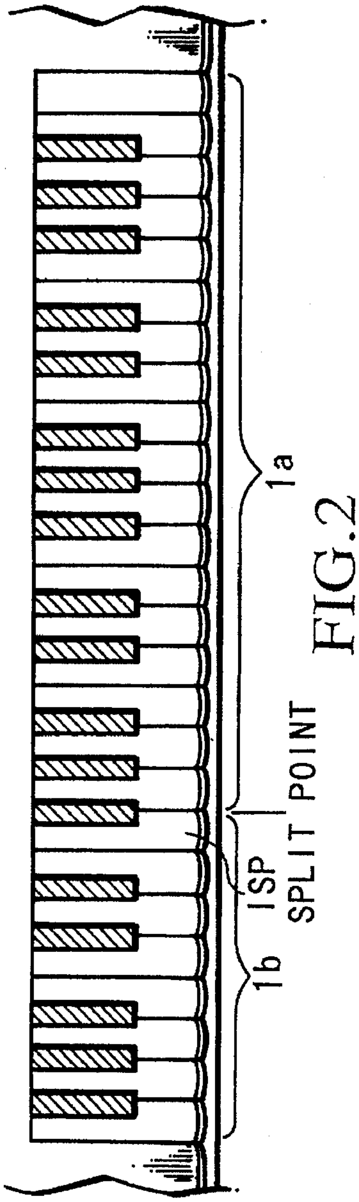
FIG. 2 is a plan view showing an appearance of a keyboard.

In the keyboard 1 shown in FIG. 2, a different tone color is assigned to each of the registers 1*a* and 1*b*. Thus, when depressing the key belonging to one register, the keyboard 1 can produce a musical tone having a specific tone color assigned to that register.

Further, it is possible to set a dual-sounding function in the keyboard 1. When the dual-sounding function is designated, two kinds of tone colors can be assigned to each register; hence, when one key belonging to one register is depressed, the keyboard 1 can simultaneously produce two musical tones each having a different tone color. In other words, when depressing two keys which belong to the two registers respectively, It is possible to simultaneously produce the maximum four musical tones having the respective tone colors. Moreover, an automatic-accompaniment function can be further set to the lower register 1*b*. According to the automatic-accompaniment function, chords and bass sounds are automatically produced in accordance with a predetermined accompaniment pattern on the basis of the depressed key and the designated kind of rhythm. All of the above-mentioned functions are well known, so that they can be realized by using the known technology.

In FIG. 1, a key-depression state or a key-release state is detected by a key-operation detecting circuit 2 with respect to each of the keys provided in the keyboard 1. When detecting any of those states, the key-operation detecting circuit 2 outputs a detection signal which is supplied to a central processing unit (i.e., CPU) 3 through a bus. As the detection signal, a keycode representing the tone pitch of the depressed key is outputted.

A timer 4 creates an interrupt signal INT, which is supplied to the CPU 3. In accordance with a timing at which the interrupt signal INT is supplied to the CPU 3, the CPU 3 executes programs corresponding to a loop processing provided in a main routine, the contents of which will be described later.

A read-only memory (i.e., ROM) 5 stores programs and the like which are used by the CPU 3. A random-access memory (i.e., RAM) 6 stores several kinds of registers as well as the performance data which are used when playing a musical performance.

A tone generator 7 provides a plurality of channels, which are activated in a time-division manner under the control of the CPU 3. Herein, each channel can create a musical tone signal. The musical tone signal outputted from the tone generator 7 passes through an accumulator, a reverberation imparting portion and a digital-to-analog converter (i.e., D/A converter) in turn; however, the illustration of those elements are omitted in FIG. 1. The accumulator performs a processing of accumulation; the reverberation imparting portion performs a processing to Impart the reverberation effect; and the D/A converter performs a processing of digital-to-analog conversion. Then, the musical tone signal which has been subjected to those processings is supplied to a sound system SS which is configured by two series of sounding circuits each containing an amplifier and a speaker. Thus, the sound system SS produces a musical tone (or musical tones) corresponding to the musical tone signal supplied thereto.

A numeral 8 denotes a switch unit containing several kinds of push-button switches. An on/off state of each switch is detected by a switching-operation detecting circuit 9. Then, a detection signal outputted from the switching-operation detecting circuit 9 is supplied to the CPU 3 through the bus.

A numeral 10 denotes a display portion which contains eight LED-type indicators and one seven-segment-type three-digit display unit. Under the control of the CPU 3, each of the indicators is turned on or off, while the display unit performs a numeric representation. The above-mentioned elements of the display portion 10 and the switches of the switch unit 8 are arranged on a panel face of an operation panel P.

Next, an appearance of the panel face of the operation panel P will be described by referring to FIG. 3.

Figure 3:
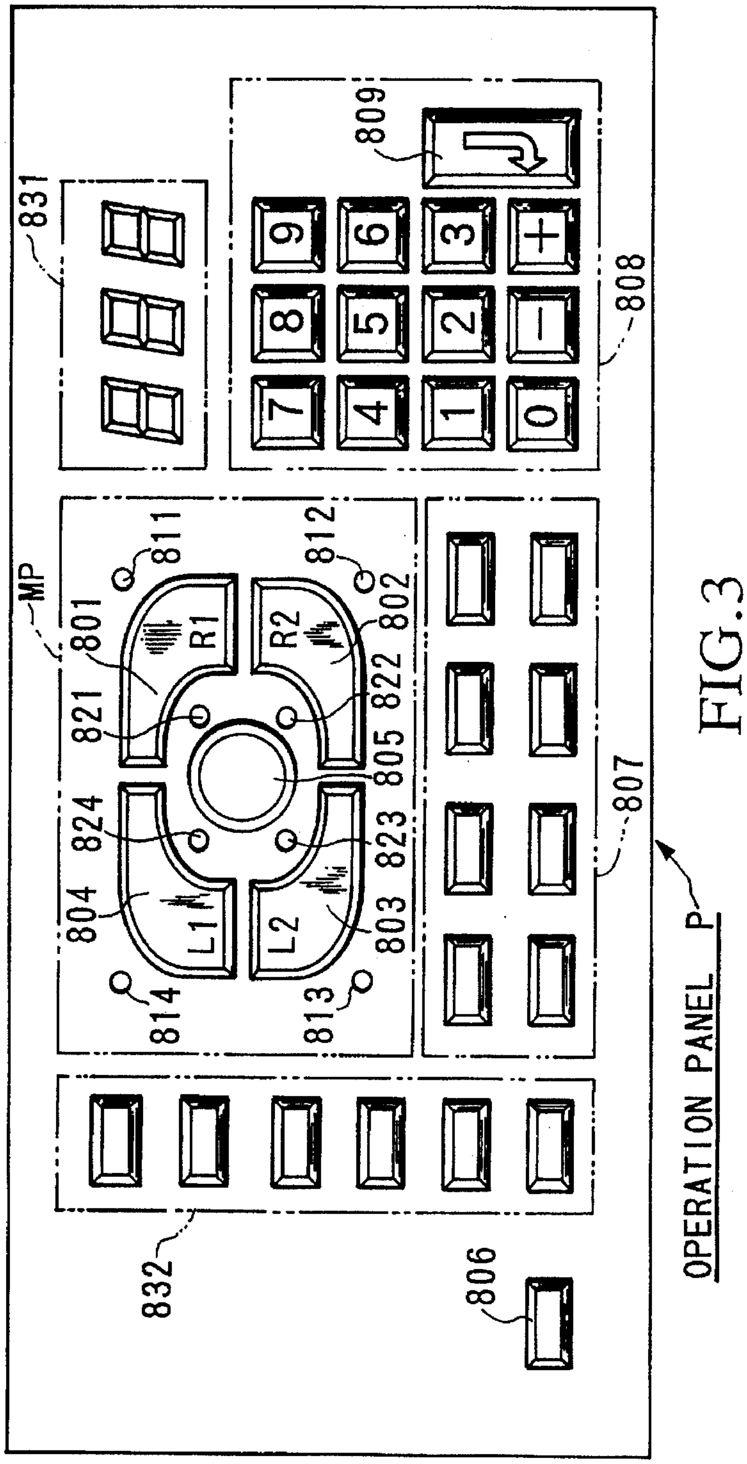
FIG. 3 is a front view showing a panel face of an operation panel.

As shown in FIG. 3, a main panel MP is arranged at a central-upper portion of the operation panel P. In the main panel MP, an edit switch (represented by a symbol "ESW") 805 approximately having a circular shape is surrounded by four series designation switches 801 to 804. In addition, four LEDs 811 to 814 are arranged outside the series designation switches 801 to 804, while other four LEDs 821 to 824 are also arranged inside the series designation switches 801 to 804.

In the main panel MP, if the position of the edit switch 805 is regarded as the origin and the whole area of the main panel MP is divided into four quadrants, the LEDs 821, 811 and the series designation switch 801 are provided in the first quadrant; the LEDs 824, 814 and the series designation switch 804 are provided in the second quadrant; the LEDs 823, 813 and the series designation switch 803 are provided in the third quadrant; and the LEDs 822, 812 and the series designation switch 802 are provided in the fourth quadrant. In shorts, those LEDs and the series designation switches are arranged in a radial manner about the edit switch 805.

Next, a tone-color switch unit 807 is arranged beneath the main panel MP. In this switch unit 807, eight tone-color-parameter selecting switches are arranged in a matrix of two rows and four columns.

On the right side of the tone-color switch unit 807, there is provided a ten-key unit 808 which is used to input a numeric value. This ten-key unit 808 contains a switch 809 which is used to define the numeric value currently designated. On the upper side of the ten-key unit 808, there is provided a display unit 831 which is capable of displaying the inputted numeric value as a three-digit number.

Each of the switches provided in the tone-color switch unit 807 is used to select the tone-color parameter which is used to perform a fine control for the state of one tone color to be set. As the tone-color parameters, there are provided a tone-color number, a tone volume, a panning element, a depth of reverberation, a sustain element, an octave element, an attack element and a MIDI element. Each of those eight parameters corresponds to each of the eight switches provided in the tone-color switch unit 807. By depressing a certain tone-color-parameter selecting switch, it is possible to select a certain tone-color parameter. Further, by inputting the numeric value by the ten-key switch unit 808, it is possible to set the state of the tone-color parameter currently selected.

Next, each of the tone-color parameters will be simply described. The tone-color number is a serial number assigned to each of the plural tone colors; the tone volume represents a sounding level of the musical tone with respect to the tone color; the panning element is provided to designate a sound-image position which is located with respect to the tone color; the depth of reverberation corresponds to a reverberation time representing a degree of imparting the reverberation effect to the tone color; the sustain element is a value for controlling a level of the sustain portion of the envelope waveform to be applied to the tone colors; the octave element designates a musical scale used for the tone colors; the attack element designates a value of the attack portion of the envelope waveform to be applied to the tone color; and the MIDI element designates a channel number representing a certain channel by which the data transfer is performed between the electronic musical instruments.

On the left side of the tone-color switch unit 807, there is provided a parameter switch unit 832 containing six parameter selecting switches which are disposed on the panel face in a vertical direction. Each of the parameter selecting switches is provided to select a certain parameter for the musical tone to be produced. As the parameters to be selected, there are provided a reverberation kind, an accompaniment-part number, a tuning element and the like. Each of those parameters corresponds to each of the parameter selecting switches. Since those parameters do not directly concern with the operations of the electronic musical instrument according to the present invention, the description thereof will be omitted.

On the left side of the parameter switch unit 832, there is provided a split-point designating switch 806. This switch 806 is provided to designate a boundary point (or a split point) of the keyboard 1 between the upper register 1*a* and the lower register 1*b*. In an example shown in FIG. 2, a key 1SP corresponds to the split point. This split point is defined by simultaneously depressing the key 1SP and the switch 806. Incidentally, the description concerning the split point will be described later.

[B] Functions of the Switches 801–805

Next, the functions of the series designation switch 801 to 804 and the edit switch 805 will be described.

(1) Functions of the Series Designation Switches 801–804

When being depressed, the series designation switch 801 (simply referred to as an R1 switch) designates a transfer of tone color from the tone color to be edited to another tone color which is designated by tone-color-series data R1; and this switch 801 also designates a production of the musical tones using the tone color designated by the tone-color-series data R1. Similarly, the series designation switch 802 (simply referred to as an R2 switch) designates a transfer of tone color from the tone color to be edited to another tone color which is designated by tone-color-series data R2; and this switch 802 also designates a production of the musical tones using the tone color designated by the tone-color-series data R2. In the electronic musical instrument according to the present embodiment, one of the tone colors designated by the tone-color-series data R1 and R2 is only used for the production of the musical tones.

When the split-sounding function is designated, the tone-color-series data R1 and R2 are used to assign the tone colors for the upper register 1*a*. However, when the split-sounding function is not designated, those data are used to assign the tone colors for the complete ranges of the keyboard 1. Incidentally, the dual-sounding function is designated by designating the production of the musical tones with respect to both of the tone colors designated by the tone-color-series data R1 and R2 respectively.

Next, when being depressed, the series designation switch 804 (simply referred to as an L1 switch) designates a transfer of tone color from the tone color to be edited to another tone color which is designated by tone-color-series data L1; and this switch 804 also designates an on/off control for the production of the musical tones using the tone color designated by the tone-color-series data L1. Similarly, the series designation switch 803 (simply referred to as an L2 switch) designates a transfer of tone color from the tone color to be edited to another tone color which is designates by tone-color-series data L2; and this switch 803 also designates an on/off control for the production of the musical tones using the tone color designated by the tone-color-series data L2. In the present electronic musical instrument, each of the tone colors designated by the tone-color-series data L1 and L2 is independently used for the production of the musical tones. Herein, the tone-color-series data L1 and L2 are used to designate the respective tone colors which are assigned to the lower register 1*b*.

When one of the tone colors designated by the tone-color-series data L1 and L2 is selected for the production of the musical tones, the split-sounding function is set for the lower register 1*b*. On the other hand, when both of the tone colors are simultaneously selected for the production of the musical tones, the dual-sounding function is set for the lower register 1*b*.

Next, the LEDs 811–814 and 821–824 will be described. The LEDs 811 to 814 are respectively turned on when the tone colors designated by the tone-color-series data R1, R2, L2 and L1 are respectively selected for the production of the musical tones. On the other hand, the LEDs 821 to 824 are respectively turned on when the tone color to be edited coincides with the tone colors designated by the tone-color-series data R1, R2, L2 and L1 respectively. Since the present embodiment deals with only one tone color as the tone color to be edited, the number of the LEDs to be simultaneously turned on among the LEDs 821 to 824 is equal to one.

(2) Function of the Edit Switch 805

The edit switch 805 is provided to designates a transfer of mode from a certain mode currently designated to a predetermined mode in which several kinds of parameters set for the tone color are changed and corrected.

A manner of changing the tone color to be edited and/or its parameter depends upon the situation in which the edit switch 805 is depressed. Hence, the function of the edit switch 805 will be described with respect to each of the situations.

① First Situation

In a first situation where the edit switch 805 is only depressed but the tone color to be edited is not designated, the tone color designated by the tone-color-series data R1 is forced to be set as the tone color to be edited, while the tone-color number of the tone color designated by the tone-color-series data R1 is forced to be set as the parameter to be edited.

② Second Situation

In a second situation where the edit switch 805 is only depressed and the tone color to be edited has been already designated, every time the edit switch 805 is depressed, one of the tone colors designated by the tone-color-series data R1, R2, L2 and L1 is selected in turn as the tone color to be edited. Herein, every time the edit switch 805 is depressed, the switches R1, R2, L2 and L1 are sequentially turned on in a clockwise direction (see FIG. 3), so that one of their tone colors is selected in turn as the tone color to be edited. Further, the parameter designated for the tone color corresponding to the switch which is previously turned on is set as the parameter to be currently edited.

For example, when the edit switch 805 is depressed under the condition where the tone color designated by the tone-color-series data R1 is selected as the tone color to be edited and the parameter to be edited is the panning element, the tone color to be edited is changed to the tone color designated by the tone-color-series data R2. Thereafter, when the edit switch 805 is depressed again, the tone color to be edited is further changed to the tone color designated by the tone-color-series data L2. In this case, the panning element is remained as the parameter to be edited even when the tone color to be edited is changed from the tone color designated by the tone-color-series data R2 to the tone color designated by the tone-color-series data L2.

③ Third Situation

In a third situation where the edit switch 805 and one of the series designation switches 801 to 804 are simultaneously depressed, the tone color to be edited is directly changed to the tone color designated by the series designation switch, while the tone-color number is designated as the parameter to be edited. In this case, the production of the musical tones is not designated by the series designation switches 801 and 802, while the on/off control for the production of the musical tones is not designated by the series designation switches 803 and 804.

For example, when the edit switch 805 and the series designation switch 801 are simultaneously depressed under the condition where the production of the musical tones using the tone color designated by the tone-color-series data R2 is turned on but the production of the musical tones using the tone color designated by the tone-color-series data R1 is turned off, the tone color to be edited can be only changed to the tone color designated by the tone-color-series data R1 without designating the production of the musical tones using the tone color of the tone-color-series data R1. Therefore, even when the musical performance is in progress, a desired tone color can be designated as the tone color to be edited.

[C] Software Processes

Next, the software processes of the present embodiment will be described by referring to the flowcharts shown in FIGS. 4 to 10.

(1) Main Routine

Figure 4:
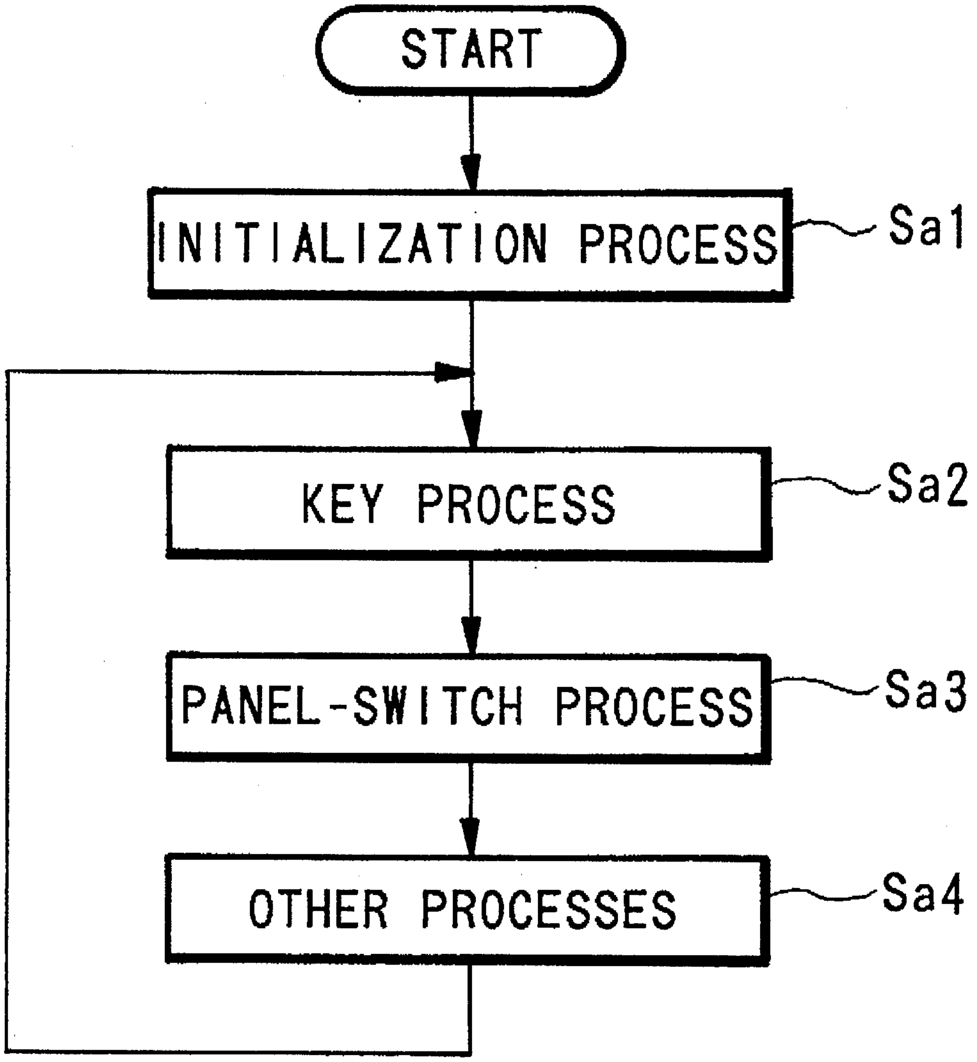
FIG. 4 is a flowchart showing a main routine.

At first, when the power is applied to the electronic musical instrument according to the present embodiment, a main routine as shown in FIG. 4 is started.

In first step Sa1 of the main routine, an initialization process is carried out so as to set several kinds of registers and flags in the RAM 6 and write several kinds of initial values. For example, when a new power supply is applied to the electronic musical instrument, several kinds of data and values are automatically set to reproduce a previous setting state which has been previously used in the electronic musical instrument before breaking the previous power supply. After completing the initialization process, the CPU 3 proceeds to a key process in step Sa2.

In the key process, the CPU 3 scans the key-depression/release state for each of the keys of the keyboard 1 (see FIG. 2) at first. The result of scanning is stored in the RAM 3. Then, the current result of scanning is compared with the previous result of scanning so as to detect a variation therebetween. Thus, the predetermined process is performed on the key in which the variation in the result of scanning is detected. In this case, if the key-depression event is detected, the CPU 3 starts to execute a routine of key-on event, the contents of which will be described later. On the other hand, if the key-release event is detected, the CPU 3 starts to execute a routine of key-off event by which the sound of the released key is muted.

In step Sa3, a panel-switch process is carried out. In this panel-switch process, a predetermined process is performed in accordance with the setting state of each of the switches provided in the switch unit 8 (see FIGS. 1 and 3). Herein, when the series designation switch 801 or 802 is turned on, the CPU 3 executes a routine of R1-switch-on event or a routine of R2-switch-on event. When the series designation switch 804 or 803 is turned on, the CPU 3 executes a routine of L1-switch-on event or a routine of L2-switch-on event.

In step Sa4, the other processes are carried out. For example, a display control process is performed on a matrix display unit (not shown). After completing the processes in step Sa4, the processing of the CPU 3 returns back to the key process of step Sa2. Thereafter, until the power supply is broken, the processes of the steps Sa2 to Sa4 are sequentially and repeatedly performed. As described above, in the main routine, the CPU 3 sequentially executes the key process, panel-switch process and other processes.

(2) Routine of Key-on Event

Figure 5:
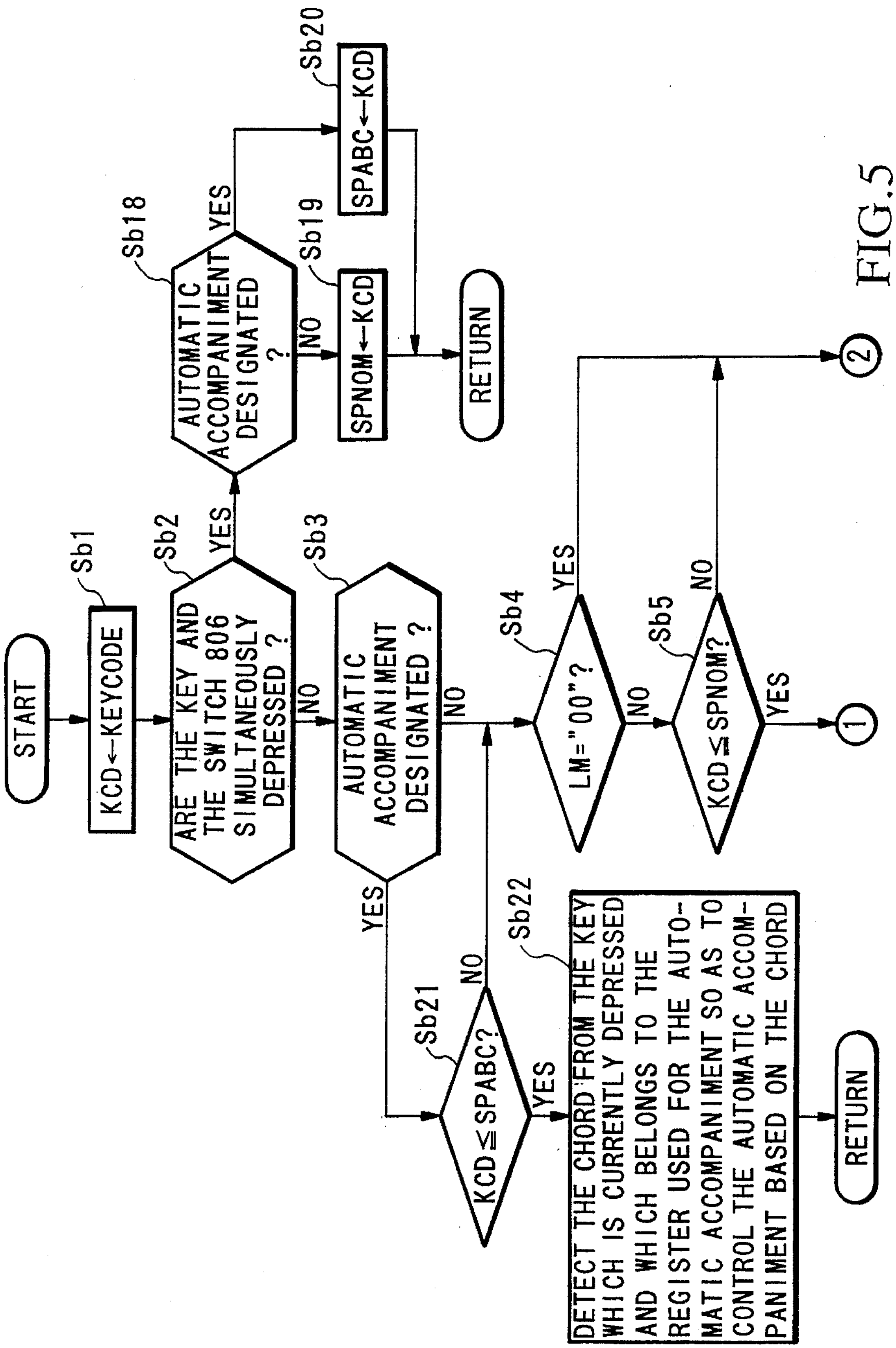
FIG. 5 is a flowchart showing a part of a routine of key-on event.
Figure 6:
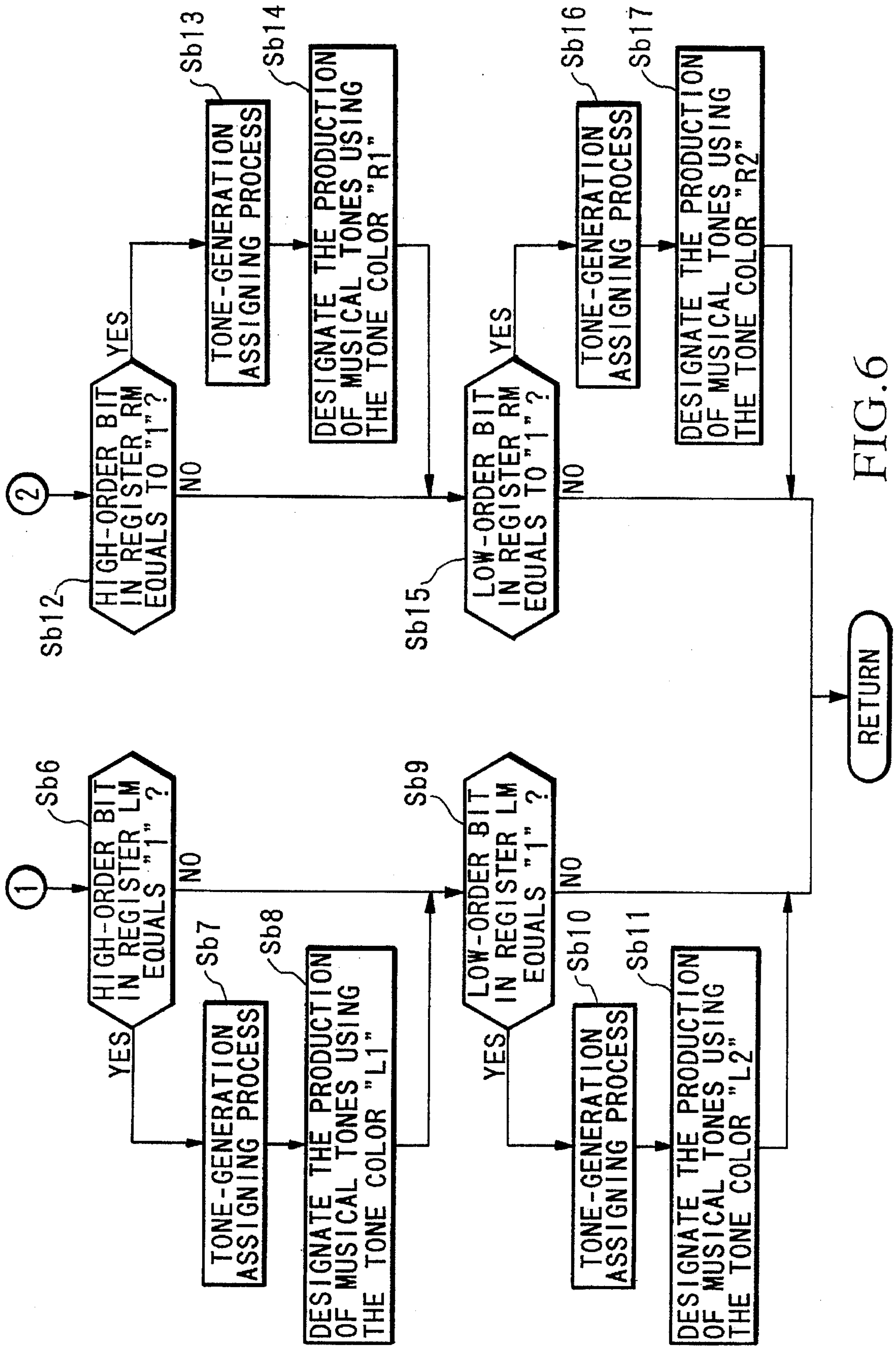
FIG. 6 is a flowchart showing another part of the routine of key-on event.

When the depressed key is detected in the aforementioned step Sa2 shown in FIG. 4, the CPU 3 starts to execute the routine of key-on event, the contents of which are shown in FIGS. 5 and 6. In this routine, the keycode of the depressed key is read. Thus, a sounding process is performed by use of the tone color designated by the certain tone-color-series data, which is selected, and the tone pitch represented by the read keycode.

When the depressed key in the keyboard 1 is detected, the processing of the CPU 3 firstly accesses to step Sb1, in which the keycode of the depressed key is stored in a register KCD. In next step Sb2, it is judged whether or not the depression of the key is made simultaneously with the depression of the split-point designating switch 806 (see FIG. 3).

If the key and the switch 806 are not simultaneously depressed, it is recognized that the depression of the key merely indicates a production of the musical tone; hence, in order to produce the musical tone corresponding to the depressed key, a result of judgement in step Sb2 is described by a negative term "NO", so that the processing of the CPU 3 proceeds to step Sb3. On the other hand, when the key and the switch 806 are simultaneously depressed, their depressing operations contribute to the designation of the split point which is set in the split-sounding function. In this case, the result of judgement in step Sb2 is described by an affirmative term "YES", so that the processing branches to step Sb18.

In step Sb18, it is further judged whether or not the automatic-accompaniment function is designated by operating a manual-operable member (not shown).

If the automatic-accompaniment function is not designated, a result of judgement in step Sb18 is "NO", so that the processing proceeds to step Sb19. In step Sb19, the data stored in the register KCD is transferred to a register SPNOM. If the automatic-accompaniment function is designated, the result of judgement in step Sb18 turns to "YES", so that the processing branches to step Sb20. In step Sb20, the data stored in the register KCD is transferred to a register SPABC.

As described before, the data stored in the register KCD indicates the keycode representing the tone pitch of the key on which the key-depression event is detected. Thus, the data which is transferred to and stored in each of the registers SPNOM and SPABC indicates the keycode of the depressed key.

Every time the key is depressed, the keycode stored in the register SPNOM is compared with the keycode of the key currently depressed. Such comparison is carried out in order to judge whether the key currently depressed belongs to the upper register 1*a* or the lower register 1*b*. Similarly, every time the key is depressed, the keycode stored in the register SPABC is compared with the keycode of the key currently depressed. Such comparison is carried out in order to judge whether the key currently depressed belongs to a certain register whose keys are used for the automatic accompaniment. In short, each of the registers SPNOM and SPABC stores the keycode representing the tone pitch corresponding to the split point which is used in the split-sounding function or the automatic-accompaniment function.

After completing the process of step Sb19 or Sb20, the execution of this routine is ended to prepare for the next key-on event to be occurred; and then, the processing of the CPU 3 returns back to the aforementioned main routine (see FIG. 4).

Meanwhile, the result of judgement in step Sb2 is "NO", the processing of the CPU 3 proceeds to step Sb3 in which as similar to the aforementioned judging process of step Sb18, it is judged whether or not the automatic-accompaniment function is designated.

If the automatic-accompaniment function is not designated, a result of judgement in step Sb3 turns to "NO", so that the processing proceeds to step Sb4. In steps Sb4 to Sb17, the sounding process is carried out by use of the tone pitch of the depressed key. On the other hand, when the automatic-accompaniment function is designated, the result of judgement in step Sb3 turns to "YES", so that the processing branches to step Sb21.

In step Sb21, it is judged whether or not the value of the data stored in the register KCD is equal to or below the value of the data stored in the register SPABC. In other words, it is judged whether or not the depressed key belongs to the lower register 1*b* to which the automatic-accompaniment function is assigned.

In order to perform the above-mentioned judgement, the data (i.e., the keycode of the key on which the key-depression event is detected), which is stored in the register KCD in step Sb1, is compared to the keycode representing the tone pitch of the key located at the split point in the automatic accompaniment, wherein the split point has been already set in the previous execution of this routine. At this time, it is judged whether or not the data of the register KCD is equal to or below the keycode at the split point.

If a result of judgement in step Sb21 is "NO", the processing branches to step Sb4 so as to perform the normal sounding process using the tone pitch of the depressed key. On the other hand, when the result of judgement in step Sb21 turns to "YES", the processing proceeds to step Sb22.

In step Sb22, a chord is detected from the key which is currently depressed and which belongs to the register assigned to the automatic accompaniment. Based on that chord, the automatic accompaniment is controlled. Incidentally, the technology for the automatic accompaniment does not directly relate to the present invention; hence, the description thereof will be omitted.

After completing the process of step Sb22, the execution of this routine is ended, so that the processing of the CPU 3 returns back to the main routine shown in FIG. 4.

In the meantime, when both of the results of the judgements performed in steps Sb2 and Sb3 are "NO", the sounding process in steps Sb4 to Sb17 is performed by use of the tone pitch of the depressed key, wherein the contents of the sounding process depends upon the combination of the split-sounding function and dual-sounding function to be independently or simultaneously designated.

In step Sb4, it is judged whether or not data stored in a register LM is equal to a binary number "00".

The data stored in the register LM consists of two bits. Herein, a high-order bit represents an on/off state for the production of the musical tones using the tone color designated by the tone-color-series data L1. When the high-order bit is set at "1", the production of those musical tones is designated. On the other hand, a low-order bit represents an on/off state for the production of the musical tones using the tone color designated by the tone-color-series data L2. When the low-order bit is set at "1", the production of those musical tones is designated.

Therefore, in the state where the data stored in the register LM coincides with the binary number "00", the designation of the two tone colors to be assigned to the lower register 1*b* is turned off. This means that the split-sounding function is turned off.

If a result of judgement in step Sb4 is "YES", the CPU 3 performs processes of steps Sb12 to Sb17 (see FIG. 6) in order to perform the sounding process with respect to the two tone colors to be assigned to the upper register 1*a*. On the other hand, when the result of judgement in step Sb4 turns to "NO", the processing proceeds to step Sb5.

In step Sb5, it is judged whether or not the value of the data stored in the register KCD is equal to or below the value of the data stored in the register SPNOM. In other words, it is judged whether or not the depressed key belongs to the lower register 1*b*.

If a result of judgement in step Sb5 is "NO", it is detected that the depressed key belongs to the upper register 1*a*. Therefore, as similar to the case where the result of judgement in step Sb4 is "YES", the CPU 3 performs the processes of steps Sb12 to Sb17 in order to perform the sounding process with respect to the two tone colors to be assigned to the upper register 1*a*.

On the other hand, when the result of judgement in step Sb5 turns to "YES", the CPU 3 performs processes of steps Sb6 to Sb11 (see FIG. 6) in order to perform the sounding process with respect to the two tone colors in accordance with the on/off state for the production of the musical tones which is designated by the tone-color-series data.

In step Sb6 (see FIG. 6), it is judged whether or not the high-order bit of the data stored in the register is set at "1". In other words, it is judged whether or not the CPU 3 designates (or activates) the production of the musical tones using the tone color designated by the tone-color-series data L1. If a result of judgement in step Sb6 is "YES", the processing of the CPU 3 proceeds to step Sb7 in which a tone-generation assigning process is carried out. After completing the process of step Sb7, the processing of the CPU 3 proceeds to step Sb8. In step Sb8, the CPU 3 designates the production of the musical tones using the tone color designated by the tone-color-series data L1, wherein each of the musical tones is produced in the tone pitch corresponding to the key to be depressed. Herein, the property of the tone color designated by the tone-color-series data L1 is determined based on several kinds of tone-color parameters as described before. Thus, the tone generator 7 performs the production of the musical tone, using the tone color designated by the tone-color-series data L1, in the tone pitch of the key which belongs to the lower register 1b and is depressed by the performer. Meanwhile, when a result of judgement in step Sb6 is "NO", or when the process of step Sb8 is completed, the processing of the CPU 3 proceeds to step Sb9. In step Sb9, it is judged whether or not the low-order bit of the data stored in the register LM is set at "1". In other words, it is judged whether or not the CPU 3 designates the production of the musical tones using the tone color designated by the tone-color-series data L2. If a result of judgement in step Sb9 is "YES", the processing proceeds to step Sb10 in which a tone-generation assigning process is carried out. In next step Sb11, the CPU 3 designates the production of the musical tones, using the tone color designated by the tone-color-series data L2, in the tone pitch of the key to be depressed. Thus, the tone generator performs the production of the musical tone, using the tone color designated by the tone-color-series data L2, in the tone pitch of the key which belongs to the lower register 1b and is depressed by the performer.

In each of the steps Sb7 and Sb10 (or in each of steps Sb13 and Sb16 which will be described later), the tone-generation assigning process is carried out. According to the tone-generation assigning process, the CPU 3 searches the channel whose amplitude level is the most attenuated among the plural channels provided in the tone generator 7; and then, the tone-generating operation of that channel is forced to be stopped so that the channel is set as an idle channel. Thus, the musical tones corresponding to the plural keys which belong to the complete range of the keyboard 1 or the certain split range of the keyboard 1 can be produced in the tone color designated by each of the tone-color-series data.

As described above, when the CPU 3 designates the production of the musical tones using the tone color of the tone-color-series data L1, the musical tones are produced in that tone color by the processes of steps Sb7 and Sb8. When the CPU 3 designates the production of the musical tones using the tone color of the tone-color-series data L2, the musical tones are produced in that tone color by the processes of steps Sb10 and Sb11.

Meanwhile, if the split-sounding function is turned off, in other words, if the result of judgement in step Sb4 (see FIG. 5) is "YES", the processing of the CPU 3 proceeds from step Sb4 to step Sb12 shown in FIG. 6. Similarly, if the depressed key belongs to the upper register 1a even when the split-sounding function is turned on, in other words, if the result of judgement in step Sb5 is "NO", the processing of the CPU B proceeds from step Sb5 to step Sb12. In the above-mentioned cases, processes of steps Sb12 to Sb17 are carried out.

In step Sb12, it is judged whether or not a high-order bit of data stored in a register RM is set at "1".

The data stored in the register RM consists of two bits. Herein, the CPU 3 designates the production of the musical tones using the tone color designated by the tone-color-series data R1 when the high-order bit of the data stored in the register RM is set at "1", while the CPU 3 designates the production of the musical tones using the tone color designated by the tone-color-series data R2 when the-low-order bit is set at "1". In the present embodiment, both of the high-order bit and low-order bit in the 2-bit data stored in the register RM are not simultaneously set at "0". If the data of the register RM is represented by a binary number "00", there occurs a sound-off state in which the production of the musical tones using the tone color assigned to the upper register 1a (or the complete range of the keyboard 1 when the split-sounding function is turned off) should be turned off, so that even when depressing any of the keys, the musical tones cannot be produced. In order to avoid the above-mentioned sound-off state, the data stored in the register RM is controlled not to coincide with the binary number "00".

If the result of judgement in step Sb12 is "YES", the processing proceeds to step Sb13 in which a tone-generation assigning process is carried out. After completing this process of step Sb13, the processing proceeds to step Sb14 in which the CPU 3 designates the production of the musical tone using the tone color designated by the tone-color-series data R1 in the tone pitch corresponding to the key to be depressed. Thus, the tone generator 7 contributes to the production of the musical tones, using the tone color of the tone-color-series data R1, in respective tone pitches which are sequentially depressed. On the other hand, when the result of judgement in step Sb12 turns to "NO", or when completing the process of step Sb14, the processing branches to step Sb15. In step Sb15, it is judged whether or not the low-order bit of the data stored in the register RM is set at "1". In other words, it is judged whether or not the CPU 3 designates the production of the musical tones using the tone color designated by the tone-color-series data R2. If a result of judgement in step Sb15 is "YES", the processing proceeds to step Sb16 in which a tone-generation assigning process is carried out. After completing the process of step Sb16, the processing proceeds to step Sb17 in which the CPU 3 designates the production of the musical tone using the tone color designated by the tone-color-series data R2 in the tone pitch corresponding to the key to be depressed. Thus, the tone generator 7 contributes to the production of the musical tones, using the tone color of the tone-color-series data R2, in respective tone pitches corresponding to the keys which are sequentially depressed. As described above, the processes of steps Sb13 and Sb14 contribute to the production of the musical tones, using the tone color of the tone-color-series data R1, in the tone pitches of the keys to be sequentially depressed, while the processes of steps Sb16 and Sb17 contribute to the production of the musical tones, using the tone color of the tone-color-series data R2, in the tone pitches of the keys to be sequentially depressed. Thus, the CPU 3 independently designates the production of the musical tones using the tone color of the tone-color-series data R1 or the production of the musical tones using the tone color of the tone-color-series data R2.

After completing the process of step Sb11 or Sb17, or when the result of judgement in step Sb9 or Sb15 turns to "NO", the execution of this routine as shown in FIGS. 5 and 6 is terminated; and then, the processing of the CPU 3 returns back to the aforementioned main routine (see FIG. 4).

As described above, in the routine of key-on event, it is firstly judged whether or not the key currently depressed is used to set the split point. If so, the keycode of the depressed key is stored in the register whose contents indicate the split point. If not, the CPU 3 discriminates which register the depressed key belongs to. Then, the production of the musical tones using the tone color of the tone-color-series data assigned to the register is performed by use of the tone pitches of the keys to be sequentially depressed; or, the automatic-accompaniment process is carried out in response to the depressed key.

(3) Panel-switch Process

In the panel-switch process, the parameters defining the tone color are designated; their values are changed; the production of the musical tones using the tone color designated by the tone-color-series data is turned on or off; and predetermined setting is performed by operating the switches provided in the switch unit 8 (see FIG. 1). In order to do so, the contents of several kinds of registers are changed or newly set in response to the manual operations applied to the switches.

(a) Routine of R1 (or R2) Switch-on Event

Figure 7:
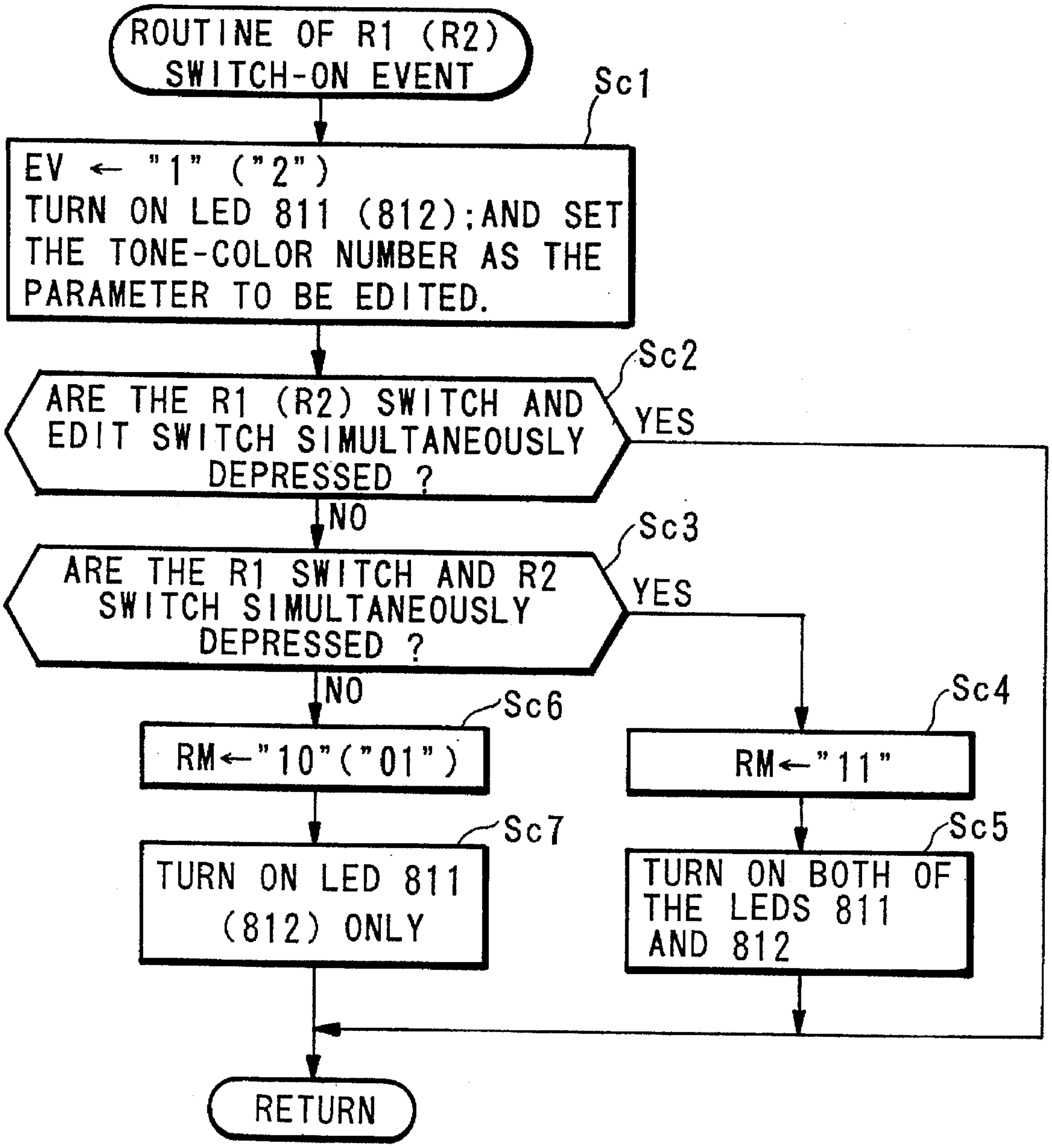
FIG. 7 is a flowchart showing a routine of R1 (or R2) switch-on event.

When the R1 switch 801 shown in FIG. 3 is depressed, in step Sa3 in the main routine (see FIG. 3), the CPU 3 starts to execute the routine of R1 (or R2) switch-on event, the contents of which is shown In FIG. 7.

Since the contents of the routine which is activated when the R2 switch 802 is depressed is similar to that of the routine which is activated when the R1 switch 801 is depressed, FIG. 7 shows the same contents of those routines. Incidentally, FIG. 7 mainly represents the contents of the routine of R1 switch-on event, whereas symbols and numbers described in parentheses correspond to the routine of R2 switch-on event.

Next, the routine of R1 switch-on event will be described in detail.

At first, when the R1 switch 801 is depressed, the following process of step Sc1 is activated. In step Sc1, the CPU 3 sets a value "1" in a register EV; the CPU 3 turns on the LED 821 but turns off the other LEDs 822–824; and, the CPU 3 also changes the parameter to be edited to the tone-color number, wherein the parameter is used to define the tone color designated by the tone-color-series data R1.

The above-mentioned register EV is provided to store the value indicating which tone color of the tone-color-series data is used as the tone color to be edited. Concretely, there is established a certain relationship between the value stored in the register EV and the tone color to be edited, as follows:

a value "0" indicates that no tone color to be edited is existed;

a value "1" indicates that the tone color designated by the tone-color-series data R1 is used as the tone color to be edited;

a value "2" indicates that the tone color designated by the tone-color-series data R2 is used as the tone color to be edited;

a value "3" indicates that the tone color designated by the tone-color-series data L2 is used as the tone color to be edited; and a value "4" indicates that the tone color designated by the tone-color-series data L1 is used as the tone color to be edited.

In step Sc2, it is judged whether or not the R1 switch is simultaneously depressed together with the edit switch 805.

The simultaneous depression of those switches indicates a certain mode in which the CPU 3 does not designate the production of the musical tones using the tone color of the tone-color-series data R1 but the tone color to be edited is directly changed to the tone color of the tone-color-series data R1. In this mode, there is no need to perform the other processes in this routine; hence, the execution of this routine is terminated when a result of judgement in step Sc2 is "YES".

On the other hand, if the switches 801 and 805 are not depressed simultaneously, the result of judgement in step Sc2 is "NO". Hence, the processing of the CPU 3 proceeds to step Sc3.

In step Sc3, it is judged whether or not the R1 switch is simultaneously depressed together with the R2 switch.

The simultaneous depression of those switches indicates the dual-sounding function using the upper register 1*a* under the state where the split-sounding function is turned on, whereas it indicates the dual-sounding function using the complete range of the keyboard 1 under the state where the split-sounding function is turned off. In short, the simultaneous depression of the switches 801 and 802 indicates the dual-sounding function.

Therefore, when a result of judgement in step Sc3 is "YES", the electronic musical instrument is instructed to designate the production of the musical tones using both of the tone colors designated by the tone-color-series data R1 and R2. In order to do so, a binary number "11" is set in the register RM in step Sc4; and then, the LEDs 811 and 812 are turned on so as to inform the performer of the designation of the production of the musical tones using both of the tone colors R1 and R2 in step Sc5.

Meanwhile, when the R1 switch 801 is only depressed, the tone color to be edited is changed to the tone color of the tone-color-series data R1, while the tone color to be assigned to the upper register 1*a* or the complete range of the keyboard 1 is set to the tone color of the tone-color-series data R1 only.

Therefore, when the result of judgement In step Sc3 is "NO", a binary number "10" is set to the register RM so as to designate the production of the musical tones using the tone color of the tone-color-series data R1 in step Sc6; and then, only the LED 811 within the LEDs 811 and 812 is turned on so as to inform the performer of the designation of the production of the musical tones using the tone color of the tone-color-series data R1 in step Sc7.

After completing the process of step Sc5 or Sc7, the execution of this routine shown in FIG. 7 is ended; and then, the processing returns back to the main routine (see FIG. 4).

In the routine of R1 switch-on event as described above, the value "1" is firstly set to the register EV; and, if the R1 switch 801 and the edit switch 805 are simultaneously depressed, the execution of the routine is terminated. In addition, if the R1 switch 801 and the R2 switch 802 are simultaneously depressed, the binary number "11" is set in the register RM; and then, the LEDs 811 and 812 are turned on. Further, if the R1 switch 801 is only depressed, the binary number "10" is set to the register RM; and then, the LED 811 is turned on, but the LED 812 is turned off.

Similar to the above-mentioned routine of R1 switch-on event, in the routine of R2 switch-on event, a value "2" is firstly set to the register EV; and, if the R2 switch 802 and the edit switch 805 are simultaneously depressed, the execution of this routine is terminated. In addition, if the R2 switch 802 and the R1 switch 801 are simultaneously depressed, the binary number "11" is set in the register RM; and then, the LEDs 811 and 812 are turned on. Further, if the R2 switch 802 is only depressed, a binary number "01" is set in the register RM; and then, the LED 812 is turned on, but the LED 811 is turned off.

Under the processes of the routine of R1 (or R2) switch-on event, the performer can designate the dual-sounding function while using the tone color of the desired tone-color-series data as the tone color to be edited by the procedure consisting of the switching operations which will be described as follows:

① to depress both of the R1 switch 801 and the R2 switch 802 simultaneously;

② to release the R1 switch 801 while still depressing the R2 switch 802 when using the tone color of the tone-color-series data R1 as the tone color to be edited; and ③ to depress the R1 switch 801 again.

When using the tone color of the tone-color-series data R2 as the tone color to be edited, the above-mentioned switching operations ② and ③ can be rewritten as follows:

② to release the R2 switch 802 while still depressing the R1 switch 801; and ③ to depress the R2 switch 802 again.

By performing the switching operation ①, a routine of the processes of steps Sc1, Sc2, Sc3, Sc4 and Sc5 is executed once; and then, by performing the switching operation ③, that routine is executed again. Herein, the value which is stored in the register EV by the process of step Sc1 is rewritten from the value corresponding to the switches, which are depressed in the switching operation ①, to the value corresponding to the switch which is depressed again in the switching operation ③.

Thus, the tone color to be edited can be set identical to the tone color designated by the certain tone-color-series data corresponding to one of the switches 801 and 802 which is lastly depressed.

(b) Routine of L1 (or L2) Switch-on Event

Figure 8:
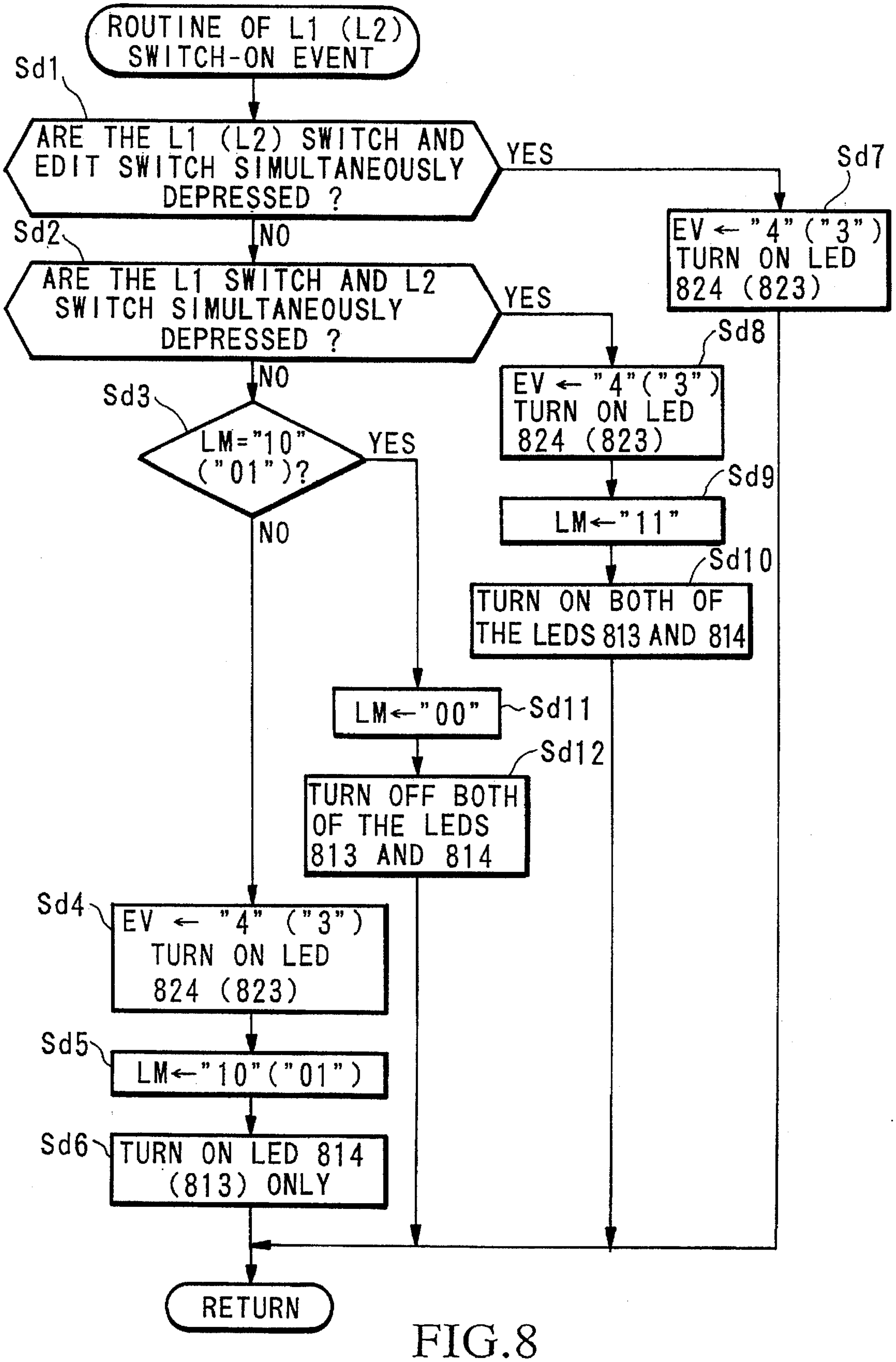
FIG. 8 is a flowchart showing a routine of L1 (or L2) switch-on event.

When the L1 switch 804 shown in FIG. 3 is depressed, the routine of L1 (or L2) switch-on event as shown in FIG. 8 is executed in step Sa3 of the main routine (see FIG. 4).

Since the contents of the routine which is started by depressing the L2 switch 803 is similar to that of the routine which is stated by depressing the L1 switch 804, FIG. 8 shows the same contents of those routines. Incidentally, FIG. 8 mainly represents the contents of the routine of L1 switch-on event, whereas symbols and numbers described in parentheses correspond to the routine of L2 switch-on event.

Firstly, when the L1 switch 804 is depressed, the processing of the CPU 3 proceeds to step Sd1. In step Sd1, it is judged whether or not the L1 switch 804 is simultaneously depressed together with the edit switch 805.

In the case where the both switches are simultaneously depressed, the CPU 3 is instructed that the production of the musical tones using the tone color of the tone-color-series data L1 is not designated but the tone color to be edited is directly changed to the tone color designated by the tone-color-series data L1. In this case, the processing of the CPU 3 branches to step Sd7 in which the value "4" is set in the register EV; the LED 824 is turned on but the other LEDs 821 to 823 are turned off; and then, the parameter to be edited, which is used to define the tone color of the tone-color-series data L1, is changed to the tone-color-number. After completing the process of step Sd7, the execution of this routine is ended.

On the other hand, when the both switches 804 and 805 are not depressed simultaneously, a result of judgement in step Sd1 turns to "NO". Hence, the processing proceeds to step Sd2.

In step Sd2, it is further judged whether or not the depression of the L1 switch 804 is simultaneously made with the depression of the L2 switch 803.

As described before, by simultaneously depressing those switches 803 and 804, the CPU 3 is instructed to designate the dual-sounding function with respect to the lower register 1*b*.

If a result of judgement in step Sd2 is "YES", the processing branches to step Sd8 in which the value "4" is set to the register EV so as to designate the tone color of the tone-color-series data L1 as the tone color to be edited. In next step Sd9, a 2-bit binary number "11" is set to the register LM so as to designate the production of the musical tones using both of the tone colors of the tone-color-series data L1 and L2. In step Sd10, in order to inform the performer of the designation of the production of the musical tones using those two tone colors, the LEDs 814 and 813 are turned on.

Meanwhile, when the L1 switch 804 is only depressed under the state where the CPU 3 has designated the production of the musical tones using the tone color of the tone-color-series data L1, the designation of the production of those musical tones are canceled. On the other hand, when the L1 switch 804 is only depressed under the state where the CPU 3 does not designate the production of the musical tones using the tone color of the tone-color-series data L1, the production of those musical tones is newly designated.

When the result of judgement in step Sd2 is "NO", the processing proceeds to step Sd3. The process of step Sd3 is provided to judge whether or not the production of the musical tones using the tone color, which is currently designated by the tone-color-series data L1, is designated. Actually, in step Sd3, it is judged whether or not a 2-bit binary number "10" is set to the register LM. In other words, it is judged whether or not the production of the musical tones only using the tone color of the tone-color-series data L1 is designated.

If a result of judgement in step Sd3 is "YES", the processing branches to step Sd11 in which a binary number "11" is set to the register LM. By executing the process of step Sd11, the designation of the production of the musical tones using the tone color of the tone-color-series data L1 is turned off; and the split-sounding function is released. In order to inform the performer of a released state of the split-sounding function, the LEDs 814 and 813 are turned off in step Sd12.

Incidentally, while the processes of steps Sd11 and Sd12 are carried out, the value stored in the register EV is not set again, so that the tone color to be edited is not changed.

In contrast, when the result of judgement in step Sd3 turns to "NO", the processing proceeds to step Sd4. In step Sd4, the value "4" is set to the register EV so as to change the tone color to be edited to the tone color of the tone-color-series data L1; and then, in order to inform the performer of the change of the tone-color to be edited, only the LED 824 among the LEDs 821 to 824 is turned on. In next step Sd5, a 2-bit binary number "10" is set to the register LM so that the tone color of the tone-color-series data L1 is only assigned to the lower register 1*b*. In step Sd6, in order to inform the performer of the state of setting the tone color in the lower register 1*b*, the LED 814 is turned on but the LED 813 is turned off.

After completing each of the processes of steps Sd6, Sd7, Sd10 and Sd12, the execution of this routine is ended, so that the processing returns back to the main routine (see FIG. 4).

In the routine of L1 switch-on event as described above, it is judged at first whether or not the L1 switch 804 is simultaneously depressed together with the edit switch 805; and then, if the result of judgement is "YES", the value "4" is set to the register EV, so that the LED 824 is selectively turned on. However, if the result of judgement is "NO", it is further judged whether or not both of the switches 804 and 803 are simultaneously depressed; and then, if the result of judgement is "YES", the value "4" is set to the register EV so that the LED 824 is selectively turned on, while the 2-bit binary number "11" is set to the register LM so that both of the LEDs 814 and 813 are turned on. Meanwhile, if the L1 switch 804 is only depressed, it is judged whether or not the 2-bit binary number "10" is set to the register LM; and then, if the result of judgement is "YES", the 2-bit binary number "00" is newly set to the register LM so that the LEDs 814 and 813 are turned on. However, if the result of judgement is "NO", the value "4" is set to the register EV so that the LED 824 is selectively turned on; and then, the binary number "10" is newly set to the register LM so that the LED 814 is turned on but the LED 813 is turned off.

As similar to the routine of L1 switch-on event, in the routine of L2 switch-on event, it is judged at first whether or not the L2 switch 803 is simultaneously depressed together with the edit switch 805. If the result of judgement is "YES", the value "3" is set to the register EV, so that the LED 823 is selectively turned on. On the other hand, if the result of judgement is "NO", it is further judged whether or not both of the switches 803 and 804 are simultaneously depressed. If the result of judgement is "YES", the value "3" is set to the register EV so that the LED 823 is selectively turned on; and then, the 2-bit binary number "11" is set to the register LM so that the LEDs 813 and 814 are turned on. In contrast, if both of the switches 803 and 804 are simultaneously depressed, it is further judged whether or not the 2-bit binary number "01" is set to the register LM. If the result of judgement is "YES", the 2-bit binary number "00" is newly set to the register LM, so that the both of the LEDs 813 and 814 are turned off. On the other hand, if the 2-bit data "01" is not set to the register LM, the value "3" is newly set to the register EV so that the LED 823 is selectively turned on; and then, the binary number "01" is newly set to the register LM so that the LED 813 is turned on but the LED 814 is turned off.

Under the operations of the routine of L1 (or L2) switch-on event, which are similar to those of the routine of R1 (or R2) switch-on event, it is possible to designate the dual-sounding function while also using the tone color of the desired tone-color-series data as the tone color to be edited by the procedure consisting of the switching operations which will be described as follows:

① to depress the L1 switch 804 and the L2 switch 803 simultaneously;

② to release the L1 switch 804 while still depressing the L2 switch 803 when using the tone color of the tone-color-series data L1 as the tone color to be edited; and ③ to depress the L1 switch 804 again.

When using the tone color of the tone-color-series data L2 as the tone color to be edited, the switching operations ② and ③ can be rewritten as follows:

② to release the L2 switch 803 while still depressing the L1 switch 804; and ③ to depress the L2 switch 803 again.

By the switching operation ①, a routine of the processes of steps Sd1, Sd2, Sd8, Sd9 and Sd10 is executed once; and then, by the switching operation ③, that routine is executed again. Herein, the value to be stored in the register EV is changed from the value corresponding to the switch, which is depressed in the switching operation ①, to the value corresponding to the switch which is depressed again in the switching operation ③.

Thus, the tone color to be edited is set identical to the tone color of the certain tone-color-series data corresponding to one of the switches 804 and 803 which is lastly depressed.

(c) Routine of Tone-color-parameter-selecting-switch-on Event

Figure 9A:
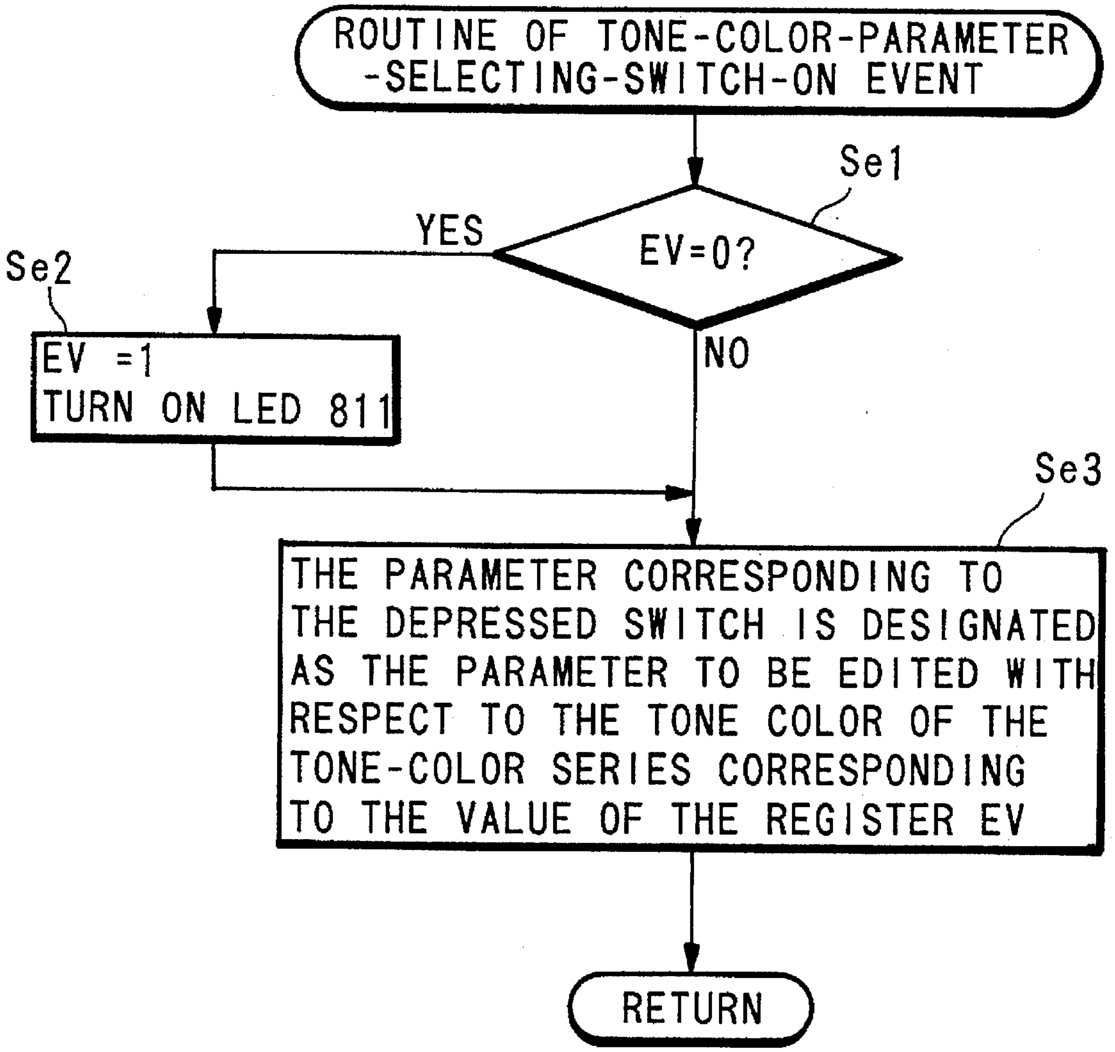
FIG. 9(A) is a flowchart showing a routine of tone-color-parameter-selecting-switch-on event.

When one of the tone-color-parameter selecting switches provided in the tone-color switch unit 807 (see FIG. 3) is depressed, the routine of tone-color-parameter-selecting-switch-on event, as shown in FIG. 9(A), is started in step Sa3 of the main routine (see FIG. 4).

When one of the tone-color-parameter selecting switches is depressed, the processing of the CPU 3 proceeds to step Se1. In step Se1, it is judged whether or not the value set to the register EV is equal to "0".

If a result of judgement in step Se1 is "YES", it is indicated that no tone color to be edited is existed. In this case, the processing proceeds to step Se2 in which the value "1" is newly set to the register EV so that the tone color of the tone-color-series data R1 is forced to be designated as the tone color to be edited; and then, the LED 811 among the LEDs 811 to 814 is selectively turned on so as to inform the performer of the state of designating the tone color.

When completing the process of step Se2, or when the result of judgement in step Se1 turns to "NO", the processing proceeds to step Se3.

In step Se3, the tone color to be edited is changed to the tone color of the tone-color-series data corresponding to the value which is currently set to the register EV; and then, the parameter corresponding to the switch which is depressed is used as the parameter to be edited with respect to the above-mentioned tone color.

After completing the process of step Se3, the execution of this routine is ended; and then, the processing of the CPU 3 returns back to the main routine (see FIG. 4).

Incidentally, the contents of the parameter itself can be corrected by inputting the numeric value which is set by the routine of ten-key-switch-on event, the contents of which will be described later.

(d) Routine of Parameter-selecting-switch-on Event

Figure 9B:
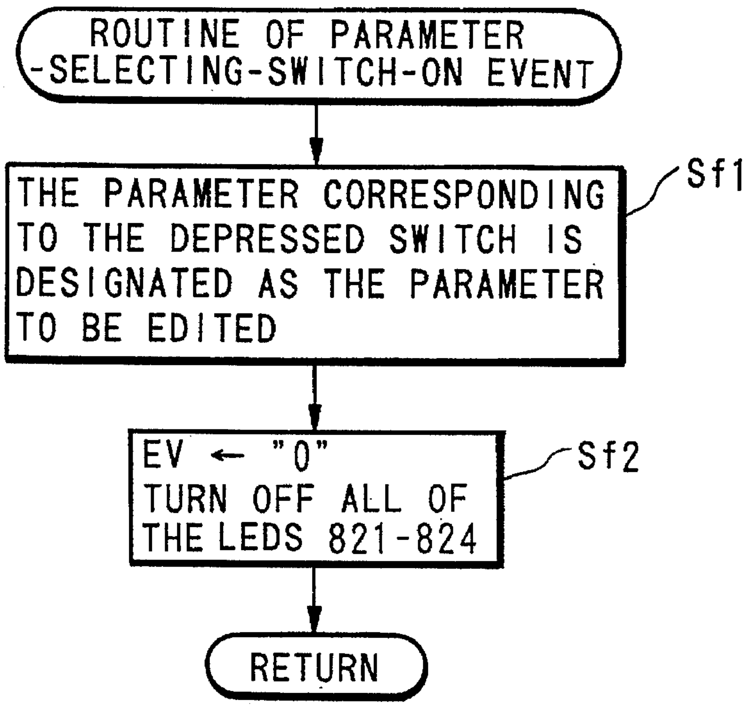
FIG. 9(B) is a flowchart showing a routine of parameter-selecting-switch-on event.

When one of the parameter selecting switches provided in the parameter switch unit 832 (see FIG. 3) is depressed, the routine of parameter-selecting-switch-on event as shown in FIG. 9(B) is started in step Sa3 of the main routine (see FIG. 4).

When one of the parameter selecting switches is depressed, the processing of the CPU 3 proceeds to step Sf1 in which the parameter corresponding to the parameter selecting switch which is depressed is designated as the parameter to be edited.

In next step Sf2, the value "0" is set to the register EV so as not to designate any of the tone colors of the tone-color-series data. This is because the parameter to be currently edited is the parameter which relates to all of the musical tones to be produced and which does not relate to the specific tone color. In step Sf2, all of the LEDs 821 to 824 are turned off.

After completing the process of step Sf2, the execution of this routine is ended; hence, the processing returns back to the main routine (see FIG. 4).

Incidentally, the contents of the parameter itself can be corrected by inputting the numeric value which is set by the routine of ten-key-switch-on event.

(e) Routine of Ten-key-switch-on Event

Figure 9C:
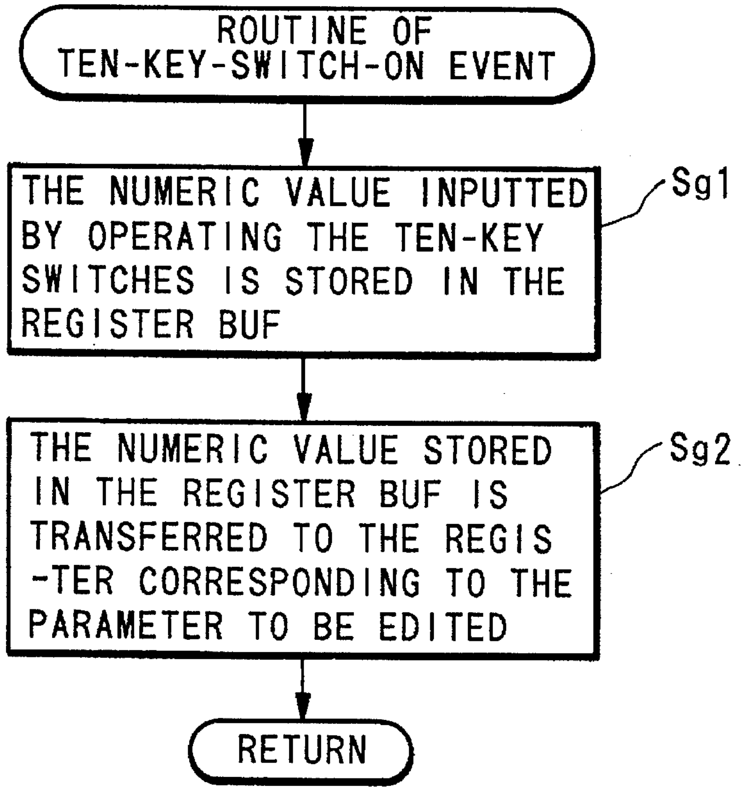
FIG. 9(C) is a flowchart showing a routine of ten-key-switch-on event.

When one of the switches provided in the ten-key unit 808 (see FIG. 3) is depressed, the routine of ten-key-switch-on event as shown in FIG. 9(C) is started in step Sa3 of the main routine (see FIG. 4).

Now, the numeric value is inputted by operating the ten-key switches and is defined by depressing the switch 809. In step Sg1, this numeric value is displayed by the display unit 831 and is temporarily stored in a register BUF.

In step Sg2, the numeric value stored in the register BUF is transferred to the register corresponding to the parameter to be currently edited (e.g., tone-color parameter or another parameter). Thereafter, the contents of that parameter is determined by the numeric value. After completing the process of step Sg2, the execution of this routine is ended; hence, the processing returns back to the main routine (see FIG. 4).

(f) Routine of Edit-switch-on Event

Figure 10:
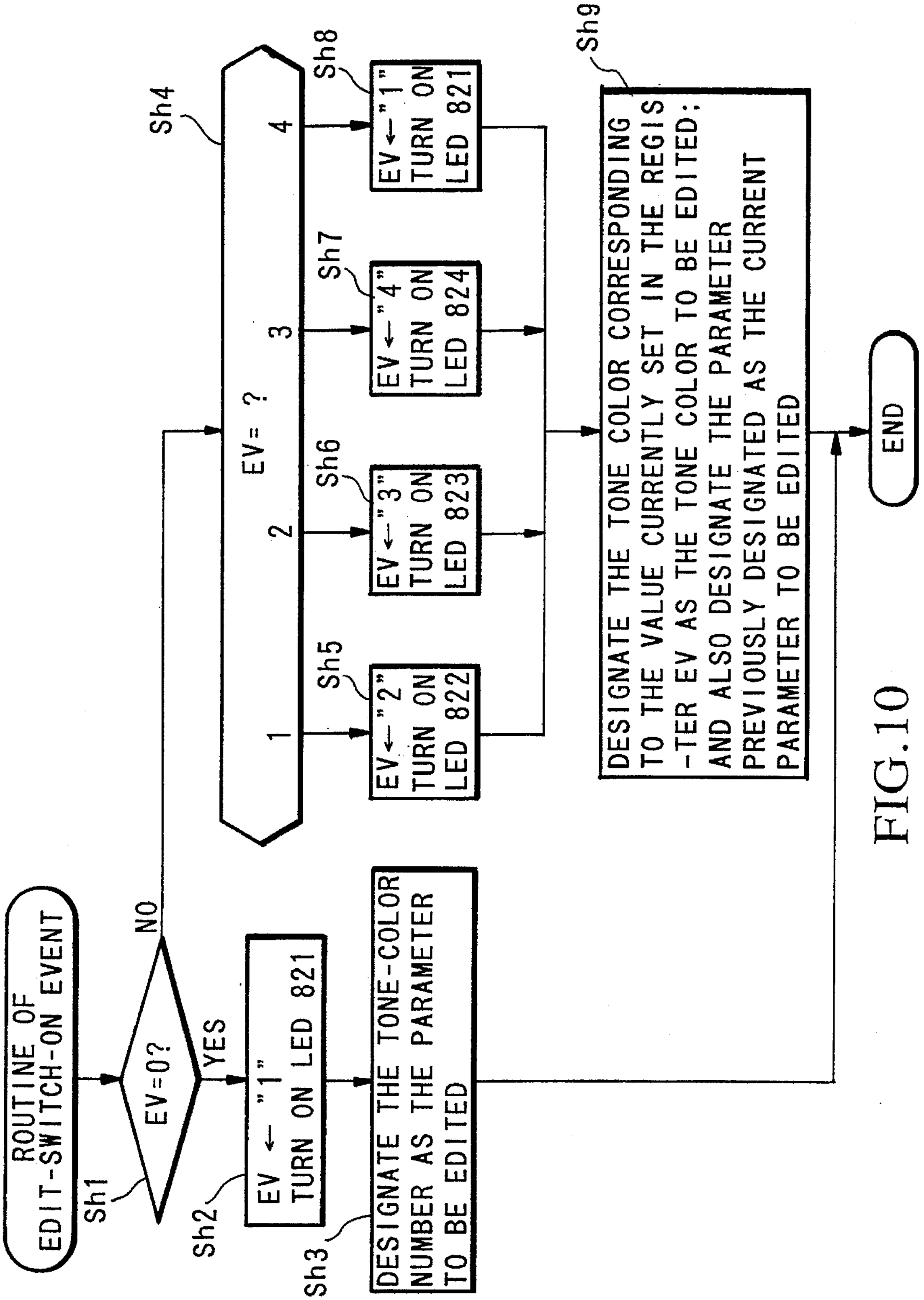
FIG. 10 is a flowchart showing a routine of edit-switch-on event.

When the edit switch 805 shown in FIG. 3 is depressed, the routine of edit-switch-on event as shown in FIG. 10 is started in step Sa3 of the main routine.

When the depression of the edit switch 805 is detected, the processing of the CPU 3 proceeds to step Sh1. In step Sh1, it is judged whether or not the value set in the register EV is equal to "0".

If a result of judgement in step Sh1 is "YES", the processing proceeds to step Sh2, in which the value "1" is newly set to the register EV; and then, the LED 821 among the LEDs 821 to 824 is selectively turned on so as to inform the performer of the depressed state of the switch. In next step Sh3, the tone-color number is designated as the parameter to be edited.

According to the processes of steps Sh2 and Sh3, when the edit switch 805 is only depressed under the state where the tone color to be edited is not designated, the tone color of the tone-color-series data R1 is forced to be set as the tone color to be edited; and then, the tone-color number is designated as the parameter to be edited with respect to that tone color.

After completing the process of Sh3, the execution of this routine is ended; hence, the processing returns back to the main routine (see FIG. 4).

Meanwhile, when the result of judgement in step Sh1 is "NO", the processing branches to step Sh4 in which the predetermined process is carried out in response to the value set in the register EV, which will be described below.

① When the value set in the register EV is equal to "1", the processing goes to step Sh5. In step Sh5, the value "2" is newly set to the register EV, so that the LED 822 is turned on but the other LEDs 821, 823 and 824 are turned off.

② When the value set in the register EV is equal to "2", the processing goes to step Sh6. In step Sh6, the value "3" is newly set to the register EV, so that the LED 823 is turned on but the other LEDs 821, 822 and 824 are turned off.

③ When the value set in the register EV is equal to "3", the processing goes to step Sh7. In step Sh7, the value "4" is newly set to the register EV, so that the LED 824 is turned on but the other LEDs 821, 822 and 823 are turned off.

④ When the value set in the register EV is equal to "4", the processing goes to step Sh8. In step Sh8, the value "1" is newly set to the register EV, so that the LED 821 is turned on but the other LEDs 822, 823 and 824 are turned off.

After completing each of the processes of steps Sh5 to Sh8, the processing proceeds to step Sh9.

In step Sh9, the tone color corresponding to the value currently set in the register EV is designated as the tone color to be edited. In addition, the parameter, which is previously designated as the parameter to be edited with respect to the tone color corresponding to the previous value of the register EV which has been set before executing this routine, is designated as the current parameter to be edited.

More specifically, when the edit switch 805 is only depressed under the state where the tone color to be edited has been already designated, one of the tone colors respectively designated by the tone-color-series data R1, R2, L2 and L1 is designated as the current tone color to be edited. Herein, every time edit switch 805 is depressed, the designation of the tone color is changed in a clockwise direction among the tone colors respectively designated by the tone-color-series data R1, R2, L2 and L1. In addition, the parameter which has been previously designated is designated as the current parameter to be edited.

Thus, the setting operation which is performed with respect to the same parameter can be performed on each of the tone colors respectively designated by the tone-color-series data R1, R2, L2 and L1.

After completing the process of step Sh9, the execution of this routine is ended; hence, the processing returns back to the main routine.

According to the present embodiment described heretofore, it is possible to turn on or off the designation of the production of the musical tones, using the tone color which is assigned to each of the registers of the keyboard 1, by depressing the switches 801 to 804. In addition, the state of the designation can be easily recognized by looking at the LEDs 811 to 814 which are respectively turned on or off.

Further, it is also possible to designate the tone color to be edited by depressing the switches 801 to 804. In addition, the state of the selection of the tone color to be edited can be easily recognized by looking at the LEDs 821 to 824 which are respectively turned on or off.

Moreover, the number of the registers which are obtained by splitting the complete range of the keyboard is not limited to two. Hence, the complete range of the keyboard can be split into three or more registers.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. An electronic musical instrument in which a complete range of a keyboard can be split into at least two registers, said electronic musical instrument comprising:

first designation means for setting tone color information, for generation of musical tones with respect to each of the registers independently;

indication means for indicating a state designating the generation of the musical tones using the tone color information;

split designation means for automatically designating a split mode to split the complete range of the keyboard into the two registers when said first designation means sets at least one tone color with respect to each of the registers;

second designation means for automatically designating a mode representing at least two tone colors, with respect to one register, so that the designated mode activates a performance which is played using the at least two tone colors by the one register; and tone generation means for determining a tone color which is used by each of the registers on the basis of instructions from the split designation means and the second designation means, so that the generation of musical tones is made using the tone color determined in each of the registers.

2. An electronic musical instrument as defined in claim 1 further comprising four switches, wherein two switches are provided to designate two tone colors respectively for use in one register, while the other two switches are provided to designate two tone colors respectively for use in another register, whereby by being depressed, each of the four switches designates the production of the musical tones using the tone color assigned thereto.

3. An electronic musical instrument as defined in claim 2 further comprising an edit switch that, when depressed, designates a parameter to be edited with respect to each of the tone colors respectively designated by the four switches.

4. An electronic musical instrument in which a complete range of a keyboard can be split into at least two registers, said electronic musical instrument comprising:

first designation means, provided for each of the two registers, for designating a production of musical tones using at least one of two tone colors which are assigned to each of the two registers;

second designation means for automatically designating a mode representing at least two tone colors, with respect to one register, so that the designated mode activates an ensemble performance which is played using the at least two tone colors by the one register;

editing means for editing a parameter which is used to define the tone color whose production of the musical tones was lastly designated by said first designation means; and indication means for indicating the tone color whose parameter is currently edited by said editing means.

5. An electronic musical instrument comprising:

a keyboard;

mode designating means for designating at least one of a split-sounding mode and a dual-sounding mode;

keyboard splitting means for splitting a complete range of the keyboard into at least two registers when the split-sounding mode is designated;

four tone-color designating switches, each of which is capable of independently designating a certain tone color, wherein two tone-color designating switches are provided to designate two tone colors respectively for use in one register, while the other two tone-color designating switches are provided to designate two tone colors respectively for use in another register;

editing means for editing at least one parameter which is used to define a property of the designated tone color;

first indicator means for indicating the tone color currently designated; and second indicator means for indicating the parameter currently edited.

6. An electronic musical instrument as defined in claim 5 wherein said first and second indicator means are configured by light-emitting diodes, so that by emitting light, said first or second indicator means indicates the designated tone color or parameter.

* * * * *